United States Patent
Uematsu et al.

(10) Patent No.: US 8,593,765 B2
(45) Date of Patent: Nov. 26, 2013

(54) HEAD GIMBAL ASSEMBLY AND DISK DRIVE WITH A PIEZOELECTRIC ELEMENT

(75) Inventors: Yoshio Uematsu, Kanagawa (JP); Tatsumi Tsuchiya, Kanagawa (JP); Tadaaki Tomiyama, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 249 days.

(21) Appl. No.: 12/973,745

(22) Filed: Dec. 20, 2010

(65) Prior Publication Data

US 2011/0149440 A1    Jun. 23, 2011

(30) Foreign Application Priority Data

Dec. 21, 2009    (JP) .................................. 2009-288712

(51) Int. Cl.
*G11B 5/56*    (2006.01)

(52) U.S. Cl.
USPC .................. 360/294.4; 360/234.5; 360/245.8

(58) Field of Classification Search
USPC .......... 360/234.5, 245.1–245.4, 245.6–245.8, 360/245, 294.1, 294.4
See application file for complete search history.

(56) References Cited

U.S. PATENT DOCUMENTS

| | | | |
|---|---|---|---|
| 6,636,387 B2 * | 10/2003 | Kikkawa et al. | 360/294.3 |
| 7,064,401 B2 | 6/2006 | Uchiyama et al. | |
| 7,242,132 B2 | 7/2007 | Hida et al. | |
| 7,247,973 B2 * | 7/2007 | Hida et al. | 310/328 |
| 7,609,487 B2 | 10/2009 | Yao et al. | |
| 8,248,735 B2 * | 8/2012 | Fujimoto et al. | 360/294.4 |
| 2002/0097529 A1 * | 7/2002 | Sato et al. | 360/294.4 |

FOREIGN PATENT DOCUMENTS

| | | |
|---|---|---|
| JP | 2002163870 | 6/2002 |
| JP | 2004289143 | 10/2004 |
| JP | 2007141434 | 6/2007 |
| WO | WO2004/093205 | 11/2004 |

* cited by examiner

*Primary Examiner* — Hoa T Nguyen
*Assistant Examiner* — Carlos E Garcia

(57) ABSTRACT

A head gimbal assembly having a stage fixed to a head-slider. A piezoelectric element which comprises; an upper surface, a first side surface, a second side surface, a lower surface, a first electrode, a second electrode, and a gap between the first and second electrodes on the lower surface, the piezoelectric element moving the stage by extension or contraction thereof according to a voltage applied to the first and second electrodes. A transmission wiring part which has a connection pad for the piezoelectric element. A cross-connector for physically and electrically cross-connecting the first electrode and the connection pad. An adhesive fixing part which is formed from an insulating adhesive and adhesively fixes the lower surface of the piezoelectric element to the transmission wiring part, between an end of the second electrode at the gap and the cross-connector.

17 Claims, 19 Drawing Sheets

HEAD GIMBAL ASSEMBLY AND DISK DRIVE WITH A PIEZOELECTRIC ELEMENT

CROSS-REFERENCE TO RELATED APPLICATION

This application claims priority from the Japanese Patent Application No. 2009-288712, filed Dec. 21, 2009, the disclosure of which is incorporated herein in its entirety by reference.

TECHNICAL FIELD

Embodiments of the present technology relate to a head gimbal assembly and a disk drive, and in particular it relates to the mounting of a piezoelectric element on an actuator.

BACKGROUND

Disk drive devices which employ a variety of recording disks, such as optical disks, magneto-optical disks, or flexible magnetic disks, are known in the art, and among these, hard disk drives (HDD) are widely used as recording devices for computers, and are also used in many items of electronic equipment, such as video recording/reproduction devices or car navigation systems.

The magnetic disks, which are used in HDDs, comprise a plurality of data tracks and a plurality of servo tracks. One or more data sectors containing user data are recorded in each data track. Each servo track comprises address information. The servo tracks consist of a plurality of items of servo data which are arranged at intervals in the circumferential direction, and one or more data sectors are recorded between each item of servo data. A head element unit is able to write data to the data sectors or read data from the data sectors by accessing the required data sector in accordance with the address information of the servo data.

The head element unit is formed on a slider which is attached on top of a suspension of an actuator. The suspension and head-slider assembly is known as the head gimbal assembly (HGA). Furthermore, the actuator and head-slider assembly is known as the head-slider assembly (HSA). The pressure created by the viscosity of the air between the slider floating surface opposite the magnetic disk and the rotating magnetic disk is balanced with the pressured applied in the direction of the magnetic disk by the suspension so that the head-slider can float above the magnetic disk. The actuator is pivoted about a pivot shaft, whereby the head-slider is moved to the intended track and is also positioned above said track.

There is now a need for improved accuracy in the positioning of the head-slider as the TPI (tracks per inch) increases in magnetic disks. However, a limit has already been reached in terms of the positioning accuracy with which the actuator is driven by the voice coil motor.

SUMMARY

Embodiments of the present technology include a head gimbal assembly having a stage fixed to a head-slider. A piezoelectric element which comprises; an upper surface, a first side surface, a second side surface, a lower surface, a first electrode, a second electrode, and a gap between the first and second electrodes on the lower surface, the piezoelectric element moving the stage by extension or contraction thereof according to a voltage applied to the first and second electrodes. A transmission wiring part which has a connection pad for the piezoelectric element. A cross-connector for physically and electrically cross-connecting the first electrode and the connection pad. An adhesive fixing part which is formed from an insulating adhesive and adhesively fixes the lower surface of the piezoelectric element to the transmission wiring part, between an end of the second electrode at the gap and the cross-connector.

DESCRIPTION OF THE DRAWINGS

The accompanying drawings, which are incorporated in and form a part of this specification, illustrate embodiments of the present technology and, together with the description, serve to explain the embodiments of the present technology.

Figure 1:
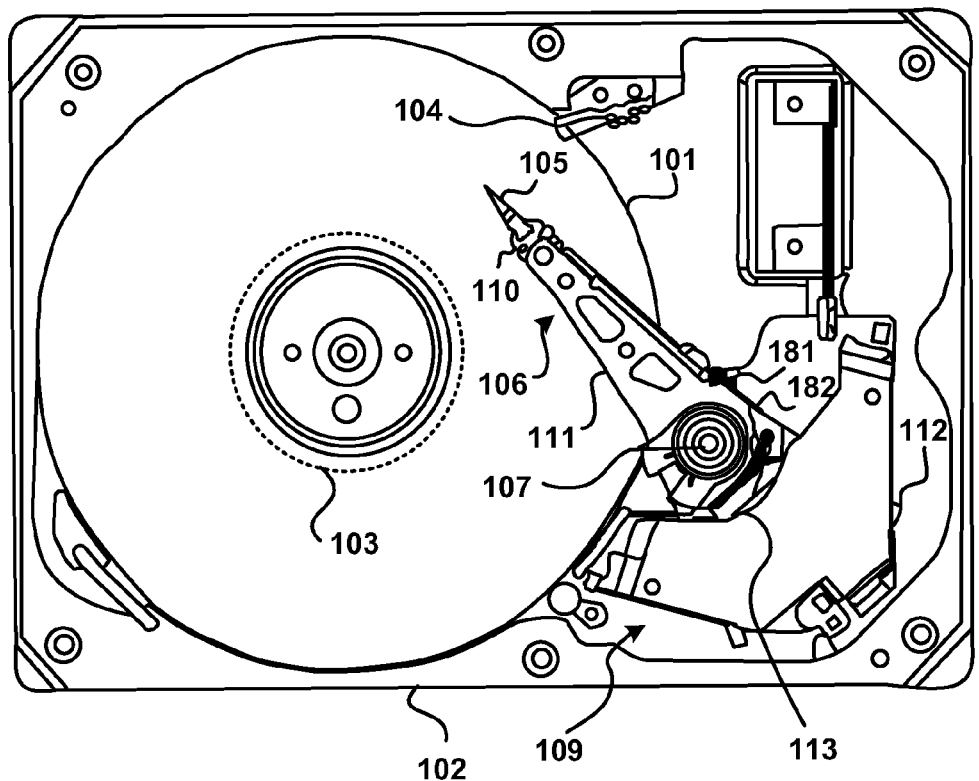
FIG. 1 is a block diagram of a plan view showing the internal structure of an HDD from which the enclosure cover has been removed, in accordance with an embodiment of the present technology.

The drawings referred to in this description should not be understood as being drawn to scale except if specifically noted.

DESCRIPTION OF EMBODIMENTS

Reference will now be made in detail to the alternative embodiments of the present technology. While the technology will be described in conjunction with the alternative embodiments, it will be understood that they are not intended to limit the technology to these embodiments. On the contrary, the technology is intended to cover alternatives, modifications and equivalents, which may be included within the spirit and scope of the technology as defined by the appended claims.

Furthermore, in the following description of embodiments of the present technology, numerous specific details are set forth in order to provide a thorough understanding of the present technology. However, it should be noted that embodiments of the present technology may be practiced without these specific details. In other instances, well known methods, procedures, and components have not been described in detail as not to unnecessarily obscure embodiments of the present technology. Throughout the drawings, like components are denoted by like reference numerals, and repetitive descriptions are omitted for clarity of explanation if not necessary.

Description of Embodiments of the Present Technology for Head Gimbal Assembly and Disk Drive with a Piezoelectric Element In accordance with embodiments of the present technology, a two-stage actuator has a piezoelectric element disposed on the suspension, and a stage to which the head-slider is fixed is pivoted by the extension and contraction of the piezoelectric element so that the head-slider can be finely positioned. The piezoelectric element is extended and contracted in accordance with an applied voltage. This means that it is important to reliably prevent damage to the electrical connection between the piezoelectric element and the transmission line.

It is also important to increase the stroke of the piezoelectric element in order to provide a sufficient range for highly accurate positioning control by the piezoelectric element. It is important for a small piezoelectric element to exhibit a large stroke from the point of view of the mounting of the piezoelectric element in a narrow region within the suspension, and the dynamics thereof. Furthermore, the HDD internal power source voltage is regulated, and therefore a large stroke is achieved by the piezoelectric element without a rise in voltage, from the point of view of a simple circuit configuration.

The head gimbal assembly according to one mode of embodiment of the present invention comprises: a gimbal having a stage; a head-slider which is fixed to the stage; a piezoelectric element which comprises an upper surface, a first side surface, a second side surface which is a surface opposite the first side surface, a lower surface, a first electrode which is formed on at least the upper surface and the first side surface, a second electrode which is formed on at least the second side surface and the lower surface, and a gap between the first and second electrodes on the lower surface, said piezoelectric element moving the stage by extension or contraction thereof according to the voltage applied to the first and second electrodes; a transmission wiring part which has a connection pad for the piezoelectric element; a cross-connector for physically and electrically cross-connecting the first electrode and the connection pad; and an adhesive fixing part which is formed from an insulating adhesive and adhesively fixes the lower surface of the piezoelectric element to the transmission wiring part, between the end of the second electrode at the gap and the cross-connector. The adhesive fixing part makes it possible to prevent damage to the cross-connector and to lengthen the electrodes of the piezoelectric element.

In one embodiment, part of the first electrode is formed on the lower surface of the piezoelectric element, and the cross-connector cross-connects that part of the first electrode and the connection pad. This makes it possible to more reliably prevent conduction faults caused by damage to the cross-connector.

In one embodiment, the cross-connector and the adhesive fixing part are in contact. This makes it possible to more reliably prevent conduction faults caused by damage to the cross-connector.

In one embodiment, the transmission wiring part comprises a spacer which projects toward the head-slider and supports the head-slider. This makes it possible to connect the piezoelectric element to the transmission wiring part in a more reliable manner.

In addition, the spacer is formed on an insulating layer of the transmission wiring part. This allows the required spacer structure to be easily designed and formed.

Furthermore, the adhesive fixing part is formed between the spacer and the cross-connector. This makes it possible to control the adhesive region of the adhesive fixing part.

In one embodiment, the head gimbal assembly further comprises a sealing part for covering the cross-connector. In addition, the sealing part adhesively fixes the piezoelectric element and the transmission wiring part and/or gimbal. This makes it possible to more reliably prevent damage to the cross-connector.

In one embodiment, the head gimbal assembly further comprises: a second cross-connector for electrically cross-connecting the second electrode and a second connection pad of the transmission wiring part; and a second adhesive fixing part which lies between the second cross-connector and the abovementioned adhesive fixing part, and adhesively fixes the lower surface of the piezoelectric element to the transmission wiring part. This makes it possible to more reliably prevent damage to the electrical cross-connector of the piezoelectric element.

In one embodiment, the piezoelectric element is disposed on the reverse of the surface of the transmission wiring part where the head-slider is connected, at the rear side of the stage, and extends and contracts in the front-to-rear direction of the suspension; and the head gimbal assembly further comprises a second piezoelectric element which is disposed in a line in the left-to-right direction with the abovementioned piezoelectric element on the reverse surface of the transmission wiring part at the rear side of the stage, and which extends and contracts in the abovementioned front-to-rear direction. This makes it possible to achieve a secondary actuator which has excellent structural features.

Another mode of the present invention concerns a disk drive comprising: an enclosure; a spindle motor which is fixed inside the enclosure and rotates a disk; and an actuator which is provided with suspension for supporting a head-slider above the disk rotated by the spindle motor, and which is pivoted by means of a voice coil motor. The suspension comprises: a gimbal having a stage to which the head-slider is fixed; a piezoelectric element which comprises an upper surface, a first side surface, a second side surface which is a surface opposite the first side surface, a lower surface, a first electrode which is formed on at least the upper surface and the first side surface, a second electrode which is formed on at least the second side surface and the lower surface, and a gap between the first and second electrodes on the lower surface, said piezoelectric element moving the stage by extension or contraction thereof according to the voltage applied to the first and second electrodes; a transmission wiring part which has a connection pad for the piezoelectric element; a cross-connector for physically and electrically cross-connecting the first electrode and the connection pad; and an adhesive fixing part which is formed from an insulating adhesive and adhesively fixes the lower surface of the piezoelectric element to the transmission wiring part, between the end of the second electrode at the gap and the cross-connector. This makes it possible to prevent damage to the electrical cross-connector between the transmission line and the piezoelectric element which serves as a secondary actuator, while also allowing an increase in the amount of extension/contraction of the piezoelectric element, and enabling superior positioning control of the head-slider.

According to the present technology, it is possible to prevent damage to the electrical cross-connector between the transmission line and the piezoelectric element which serves as a secondary actuator in the head gimbal assembly, while also allowing an increase in the amount of extension/contraction of the piezoelectric element.

One of embodiment of the present invention will be described below. In order to make the description clearer, appropriate omissions and simplifications will be made in the following disclosure and figures. Furthermore, in the figures, components which are the same bear the same reference symbols, and duplicate descriptions will be omitted, if necessary, in order to make the description clearer. In this mode of embodiment, a hard disk drive (HDD) will be described as an example of a disk drive.

The HDD in this embodiment is provided with a two-stage actuator having a positioning mechanism powered by a voice coil motor (VCM) and a positioning mechanism powered by a piezoelectric element on the suspension (secondary actuator). The HDD accurately positions the head-slider by means of the extending and contracting piezoelectric element. This mode of embodiment is characterized by the electrical and mechanical connection between the piezoelectric element and the suspension.

In one embodiment, the secondary actuator comprises two piezoelectric elements which are fixed in the gimbal tongue. The two piezoelectric elements are disposed in a line in the direction of pivoting of the actuator (the left-to-right direction), and they extend and contract in the front-to-rear direction of the suspension (the direction of flying of the head-slider). The gimbal tongue has a stage, and the head-slider is fixed on the stage by means of adhesive. The left and right piezoelectric elements perform opposing extension/contraction operations in order to make the stage pivot, and the head-slider fixed thereon also pivots. Pivoting of the head-slider allows fine movement of the head element unit (thin film head unit) in the radial direction of the magnetic disk.

The overall structure of an HDD 100 will be described first with reference to FIG. 1. The mechanical components which make up the HDD 100 are housed inside a base 102. These components inside the base 102 are controlled by means of a control circuit (not depicted) on a circuit board fixed outside the base. The HDD 100 comprises a magnetic disk 101 which is a disk for recording data, and a head-slider 105 for accessing the magnetic disk 101 (either reading or writing). The head-slider 105 comprises a head element unit for recording/reproducing user data, and a slider which has the head element unit formed on the surface thereof.

An actuator 106 holds the head-slider 105. The actuator 106 is pivoted about a pivot shaft 107 in order to access the magnetic disk 101, whereby the head-slider 105 is moved above the rotating magnetic disk 101. A VCM 109 constitutes the drive mechanism for driving the actuator 106. The actuator 106 comprises various structural members which are linked; these are, starting from the tip end in the lengthwise direction where the head-slider 105 is disposed: suspension 110, an arm 111, a coil support 112 and a VCM coil 113.

A spindle motor (SPM) 103 which is fixed to the base 102 rotates the magnetic disk 101 at a prescribed angular velocity. In FIG. 1, the magnetic disk rotates in a counter-clockwise direction. The pressure created by the viscosity of the air between the slider floating surface opposite the magnetic disk 101 and the rotating magnetic disk 101 is balanced with the pressured applied in the direction of the magnetic disk 101 by the suspension 110 so that the head-slider 105 floats above the magnetic disk 101.

Signals from the head-slider 105 and signals from the piezoelectric element of the secondary actuator are amplified by means of a preamplifier IC 181 which lies in the region of the pivot shaft of the actuator 106. The preamplifier IC 181 is mounted on a base plate 182 which is fixed to the actuator 106. When the head-slider 105 is not accessing the magnetic disk, the actuator 106 is retracted to above a ramp 104 which lies outside the magnetic disk 101. The present invention is useful in a ramp loading/unloading HDD, but it can equally be applied to an HDD in which the actuator 106 goes on standby in a specific region above the disk.

Figure 2A:
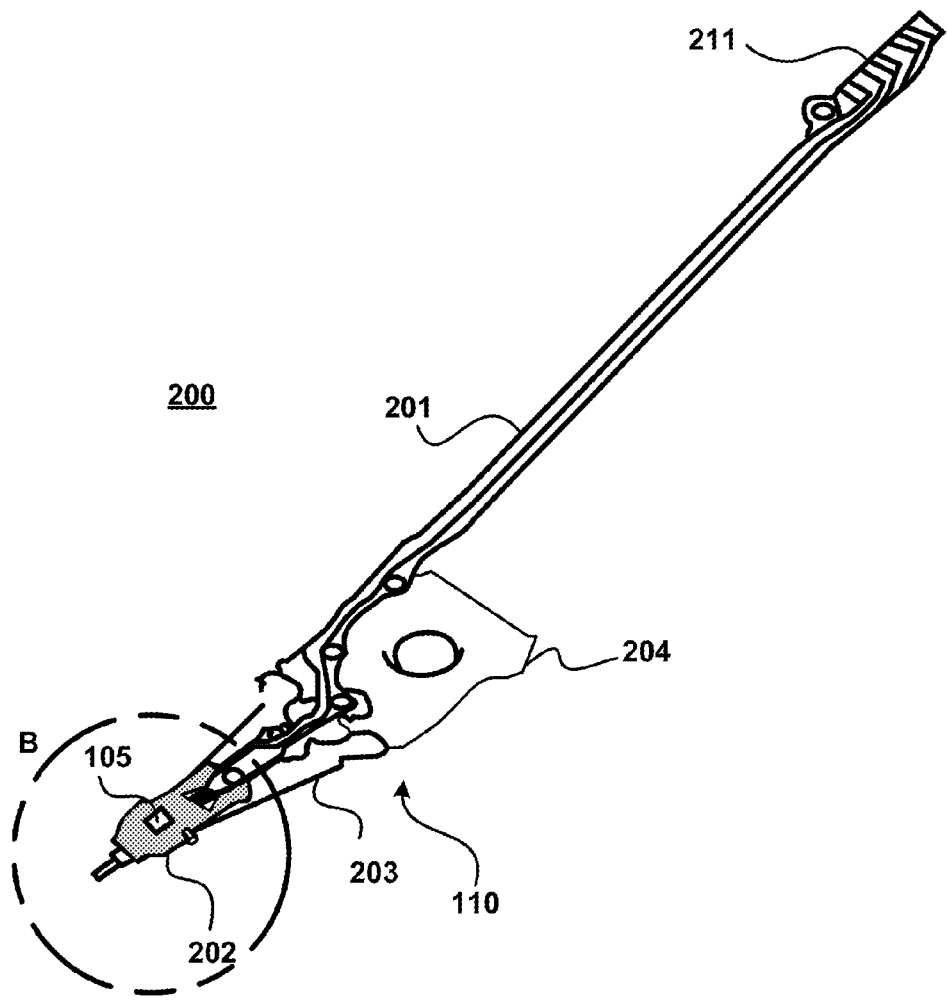
FIG. 2A is a block diagram of an oblique view showing the structure of an HGA, in accordance with an embodiment of the present technology.
Figure 2B:
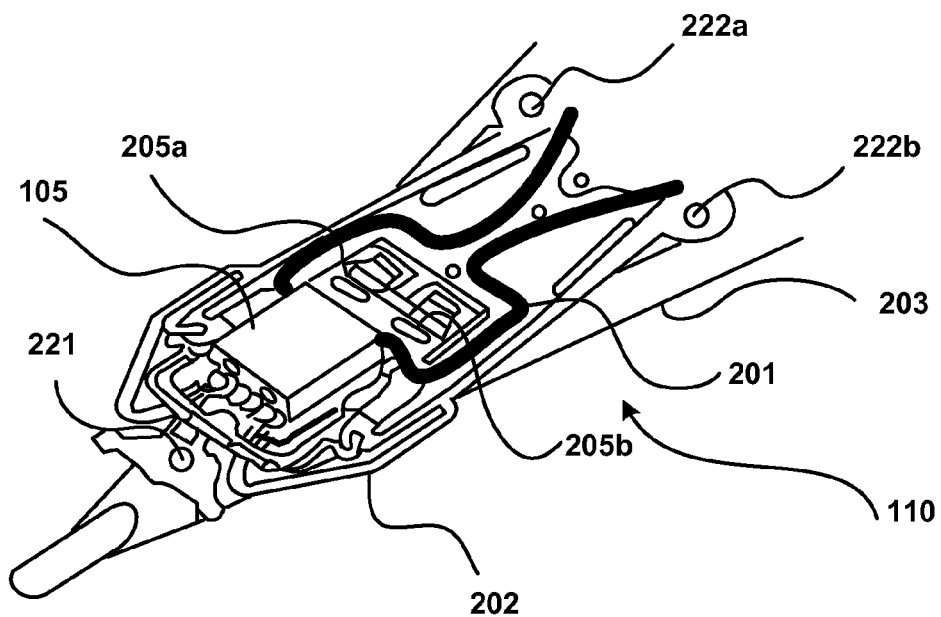
FIG. 2B is a block diagram of an enlarged view of part of the HGA, in accordance with an embodiment of the present technology.

FIG. 2A is an oblique view showing the structure of an HGA 200 of this embodiment, where the HGA 200 is seen from the disk side. FIG. 2B is an enlarged view of the section surrounded by the circle B in FIG. 2A. As shown in FIG. 2A, the HGA 200 comprises the suspension 110 and head-slider 105. The suspension 110 comprises a transmission wiring part 201, a gimbal 202, a load beam 203, and a mount plate 204.

Taking the load beam 203 as the base, the gimbal 202 is fixed thereon, and the transmission wiring 201 is formed on the gimbal 202. The head-slider 105 is fixed to the same surface as the transmission wiring part 201 on the gimbal 202. Furthermore, as shown in FIG. 2B, the HGA 200 comprises piezoelectric elements 205a, 205b which form part of the secondary actuator. The piezoelectric elements 205a, 205b are fixed to the reverse side of the surface of the suspension 110 to which the head-slider 105 is fixed.

The load beam 203 is made of stainless steel (SUS) or the like, serving as a precise flat spring. It is more rigid than the gimbal 202. The load beam 203 produces a load on the head-slider 105 by means of the spring properties thereof. The mount plate 204 and the gimbal 202 are made of stainless steel, for example. The head-slider 105 is fixed on the gimbal 202. The gimbal 202 is elastically supported, and it supports the head-slider 105, while also contributing to the urging control of the head-slider 105 by virtue of the fact that it can be freely inclined.

As shown in FIG. 2B, the gimbal 202 in the HGA 200 of this embodiment is joined to the load beam 203 at a point 221 in front of the head-slider 105 and at points 222a, b which are behind the head-slider. The joining is typically achieved by means of laser spot welding. In this way, the gimbal 202 is joined to the load beam 203 at two positions in front of and behind the head-slider 105, whereby the HGA 200 can achieve excellent load/unload characteristics (peel characteristics).

A terminal at one end of the transmission wiring part 201 which comprises a plurality of lead wires is connected to the piezoelectric elements 205a, 205b and to the head slider 105, while the terminal at the other end, which is arranged as a multi-connector, is connected to the base plate 182. Connection pads of the multi-connector 211 deal with signals from the head-slider 105 and signals from the two piezoelectric elements 205a, 205b. It should be noted that the number of connection pads varies depending on the structure of the head-slider 105 and the method for controlling the piezoelectric elements 205a, 205b.

The transmission wiring part 201 transmits signals for controlling (driving) the piezoelectric elements 205a, 205b, in addition to read and write signals. In this embodiment, the direction joining the tip end of the suspension 110 and the pivot shaft 107 is referred to as the front-to-rear direction, and the direction parallel to the main face (recording face) of the magnetic disk 101 and perpendicular to the front-to-rear direction (the direction of pivoting of the actuator 106) is referred to as the left-to-right direction.

Figure 3A:
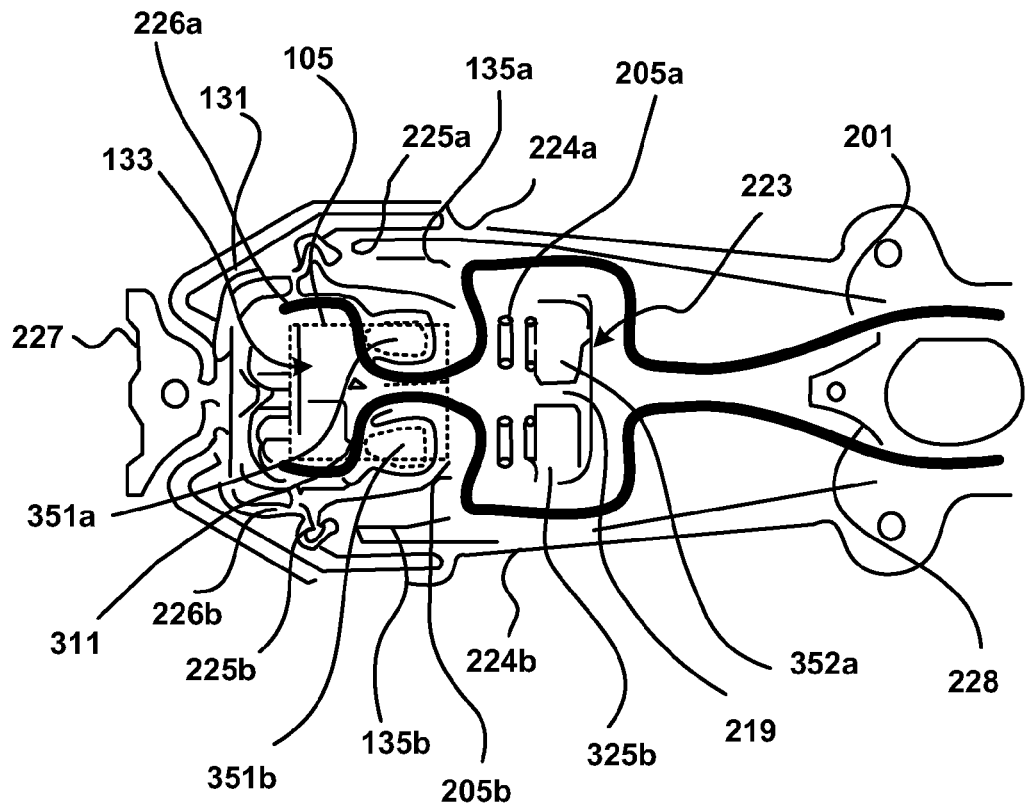
FIG. 3A is a block diagram of a plan view showing the stage on which the head-slider is disposed, the piezoelectric elements, and the surrounding structure, in the HGA in accordance with an embodiment of the present technology.
Figure 3B:
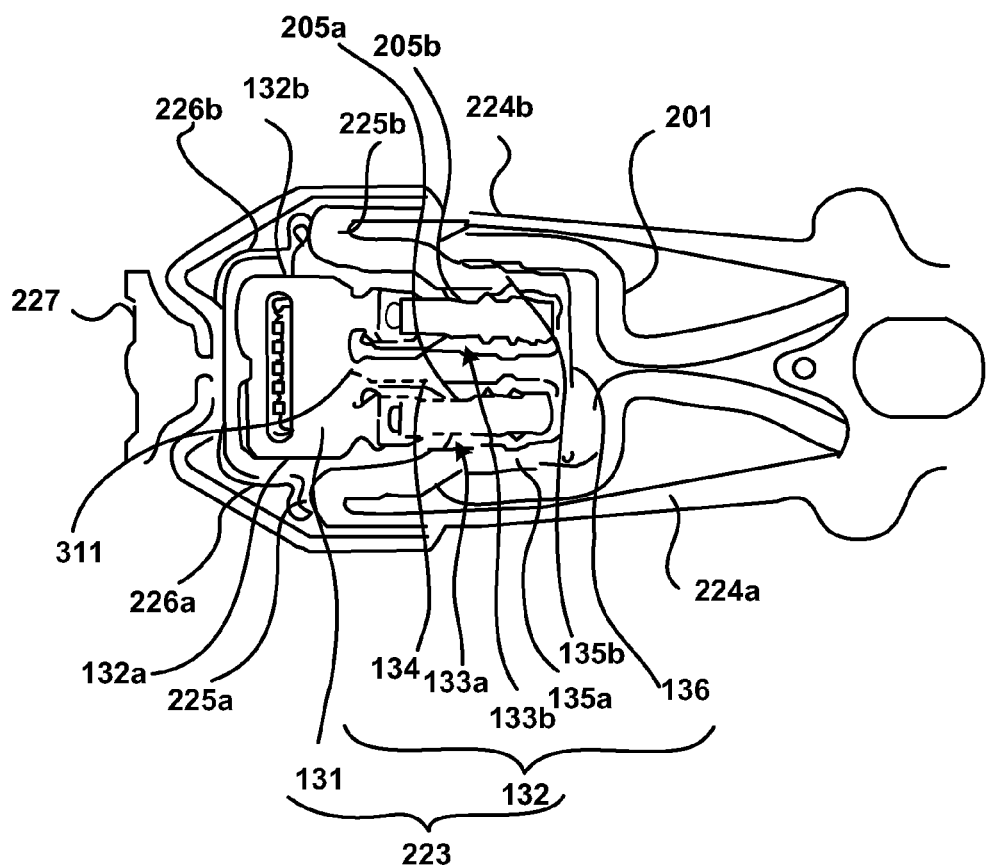
FIG. 3B is a block diagram of a plan view showing the stage on which the head-slider is disposed, the piezoelectric elements, and the surrounding structure, in the HGA in accordance with an embodiment of the present technology.

FIGS. 3A and 3B are plan views showing the head-slider 105, piezoelectric elements 205a, 205b and surrounding structure in the HGA 200 of this embodiment. The load beam 203 has been omitted from FIGS. 3A and 3B. FIG. 3A is a view of the HGA 200 seen from the magnetic disk side (the head-slider side), and FIG. 3B is a view seen from the opposite side. The head-slider 105 is shown by a broken line in FIG. 3A, and is depicted as transparent.

As described with reference to FIGS. 2A and 2B, the transmission wiring part 201 and the head slider 105 are disposed on the same face of the gimbal 202. In FIG. 3A, the transmission wiring part 201 and the head-slider 105 are shown on the upper side of the gimbal 202, while in FIG. 3B, the gimbal 202 is shown on the upper side of the transmission wiring part 201. As shown in FIG. 3B, the piezoelectric elements 205a, 205b are disposed on top of the transmission wiring part 201, on the opposite side to the head-slider 105.

The transmission wiring part 201 is present between the piezoelectric elements 205a, 205b and the head-slider 105. The piezoelectric elements 205a, 205b can be arranged with a greater degree of freedom by virtue of the fact that said piezoelectric elements 205a, 205b are disposed at and connected to the reverse of the surface of the transmission wiring part 201 where the head-slider 105 is connected. Furthermore, the piezoelectric elements 205a, 205b may be arranged in such a way as to be overlapping in the normal direction to the head-slider 105 and the disk, making it possible to reduce the size of the gimbal tongue where the piezoelectric elements 205a, 205b are disposed.

The gimbal 202 comprises a central gimbal tongue 223, and side arms 224a, 224b which extend in the front-to-rear direction away from the gimbal tongue 223 on both the left and right sides of the gimbal tongue 223. The gimbal tongue 223 is connected to the side arms 224a, 224b by means of left and right connector tabs 225a, 225b.

The gimbal tongue 223 comprises a stage 131, and a support part 132 which is connected to the stage 131 at the rear side (leading side) of the stage 131 and serves to support the stage 131. The support part 132 comprises two slits 133a, 133b which extend in the front-to-rear direction. The slits 133a, 133b are arranged in the left-to-right direction, and the piezoelectric elements 205a, 205b are positioned within the slits 133a, 133b, respectively. The stage 131 and the head-slider 105 thereon are pivoted by opposing extension/contraction in the front-to-rear direction of the piezoelectric elements 205a, 205b (one extends while the other contracts).

The support part 132 comprises a central part 134 between the slits 133a, 133b, a side part 135a between the piezoelectric element 205a and the side arm 224a, and a side part 135b between the piezoelectric element 205b and the side arm 224b. The central part 134, side part 135a, and side part 135b are joined at a rear end part (base part) 136. The side part 135a is connected to the side arm 224a by means of the connector tab 225a, while the side part 135b is connected to the side arm 224b by means of the connector tab 225b. Furthermore, the tip end (trailing end) of the central part 134 is connected to the rear end (leading end) of the stage 131.

The head-slider 105 is disposed and fixed on top of the stage 131. In FIG. 3A, which is an example configuration, the head-slider 105 is fixed by means of adhesive in an adhesive region 133. This makes it possible to firmly fix the head-slider 105. In order to enhance the peel strength of the HGA 200, the stage 131 is connected to the side arms 224a, 224b by means of left and right polyimide limiters 226a, 226b.

The side arms 224a, 224b connect in front of the stage 131. Furthermore, a support plate 227 is connected at the tip ends of the side arms 224a, 224b, and the support plate 227 is joined to the load beam 203. The load beam 203 supports the side arms 224a, 224b. In addition, the side arms 224a, 224b support the stage 131 and the head-slider 105 thereon by means of the polyimide limiters 226a, 226b.

The presence of the polyimide limiters 226a, 226b means that there is no need to form stainless steel limiters inside the gimbal, and it is possible to reduce windage caused by the reduction in mass. In addition, the limiters lie on the opposite side of the piezoelectric elements 205a, 205b to the head-slider 105 (stage 131), and therefore it is possible to reduce the flexural load exerted on the piezoelectric elements 205a, 205b in the event of an impact. It should be noted that the present invention can equally be applied to an HGA having a limiter structure other than a stainless steel limiter structure.

The stage 131 pivots about a pivot center 311 according to the extension/contraction of the piezoelectric elements 205a, 205b. The pivot center 311 lies between the piezoelectric elements 205a, 205b in the left-to-right direction, and in the center there between. Furthermore, in an embodiment, the pivot center 311 lies in front of the front end of the piezoelectric elements 205a, 205b. The contact point of a dimple in the load beam 203 and the gimbal 202 matches the pivot center 311 of the stage 131. This allows the stage 131 to pivot smoothly. The load beam 203 has the dimple with a curved face which projects toward the gimbal 202. The pivot center 311 lies above the stage-side end part of the central part 134 within the support part 132.

As shown in FIGS. 3A and 3B, the transmission wiring part 201 comprises a single sheet part 219 which overlies the leading side of the gimbal tongue 223 (support part 132). The sheet part 219 comprises a sheet-like polyimide layer, a portion of the lead wires, and connection pads 352a, 352b. The piezoelectric elements 205a, 205b are connected to front-side connection pads 351a, 351b, and the rear-side connection pads 352a, 352b, respectively.

The polyimide layer is not continuous in the front-to-rear direction between the connection pads 351a, 351b and the connection pads 352a, 352b, respectively. A hole or slit is present in the transmission wiring part 201 between the connection pad 351a and the connection pad 352a. When seen from the radial direction of the disk, the hole or slit is formed in a region of the transmission wiring part 201 which overlies the piezoelectric element 205a. The same applies to the structure between the connection pad 351b and the connection pad 352b. In this way, the connection pads 351a, 351b and the connection pads 352a, 352b are not joined by the polyimide layer in the front-to-rear direction, and therefore it is possible to reduce the effect thereof on the extension/contraction operations of the piezoelectric elements 205a, 205b.

The sheet part 219 joins the central part 134, side parts 135a, 135b, and the rear end part 136 which make up the support part 132 of the gimbal tongue 223, and improves the vibration characteristics thereof. In addition, the sheet part 219 is fixed to a gimbal body part 228 by the other portion of the transmission wiring part 201. The transmission wiring part 201 joins the rear side (leading side) of the gimbal tongue 223 and the gimbal body part 228, and supports the rear side of the gimbal tongue 223, while functioning as a limiter for restricting excessive deformation of the gimbal 202.

Figure 4:
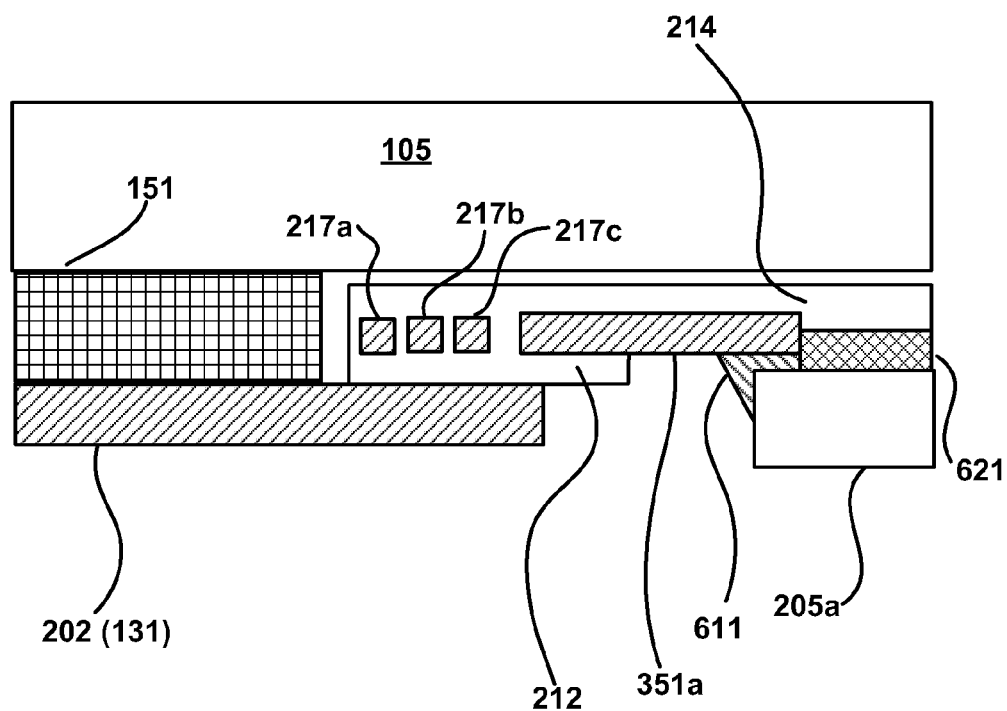
FIG. 4 is a block diagram of a cross section view schematically showing the cross-sectional structure of the part of the HGA including the piezoelectric elements, in accordance with an embodiment of the present technology.

FIG. 4 is a view in cross section schematically showing the layered structure of the HGA 200 of this embodiment, wherein the partial structures of the suspension 110, head-slider 105, and piezoelectric element 205a are each depicted schematically. The head-slider 105 is bonded to the upper side of a stainless steel layer 202 by means of adhesive 151. The stainless steel layer 202 shown in FIG. 4 corresponds to the stage 131 in FIG. 3A.

FIG. 4 shows part of the transmission wiring part 201 which extends to the rear from the stage 131 (stainless steel layer 202). The transmission wiring part 201 is formed on the same side of the stainless steel layer 202 as the head-slider 105. The transmission wiring part 201 has a layered structure comprising a polyimide lower layer 212 on the stainless steel layer 202 of the gimbal, a conductor layer there above, and a polyimide upper layer 214 there above. FIG. 4 shows three lead wires 217a-217c which are formed on the conductor layer, and the connection pad 351a which is formed on the conductor layer. The conductor layer is typically a copper layer.

Part of the polyimide lower layer 212 is removed so that the connection pad 351a is exposed from the polyimide layer. The piezoelectric element 205a is connected to the connection pad 351a. The piezoelectric element 205a is electrically and physically connected to the connection pad 351a by means of a conducting cross-connector 611. The conducting cross-connector 611 is typically a conductive adhesive or solder. A drive voltage (including the ground) is applied to the piezoelectric element 205a by way of the connection pad 351a and the conducting cross-connector 611.

The piezoelectric element 205a is bonded to the transmission wiring part 201 by means of an adhesive fixing part 621. It is thus possible to reliably prevent electrical damage to the cross-connector 611 caused by the extension/contraction operations of the piezoelectric element 205a by providing mechanical adhesion using an adhesive (the adhesive fixing part 621), in addition to the electrical cross-connector 611.

The piezoelectric element 205a is connected to the stage 131 by way of (a portion of) the transmission wiring part 201.

The piezoelectric element 205b is connected to the transmission wiring part 201 in the same way as the piezoelectric element 205a. The stage 131 is connected to the piezoelectric elements 205a, 205b by way of the transmission wiring part 201, and the extension and contraction of the piezoelectric elements 205a, 205b causes the stage 131 to pivot about the pivot center 311. The piezoelectric elements 205a, 205b extend and contract in a mutually opposing manner which makes it possible to increase the amount of pivoting of the stage 131.

The suspension 110 is produced by adhesion of a stainless steel layer, a polyimide lower layer, a conductor layer, and then a polyimide upper layer, followed by etching thereof in order to produce a prescribed shape. For example, the polyimide upper layer and conductor layer vertically above the stainless steel layer 202 are removed in order to expose the stainless steel surface of the stage 131. Furthermore, the polyimide lower layer 212 is exposed by removing the stainless steel layer 202, and the connection pad 351a is exposed by removing the polyimide lower layer 212.

The connection between the piezoelectric elements 205a, 205b and the transmission wiring part 201 will be described below in detail. The piezoelectric element 205a and the transmission wiring part 201 are connected in the same way as the piezoelectric element 205b and the transmission wiring part 201. The following description will therefore be made in relation to the piezoelectric element 205a and the transmission wiring part 201.

Figure 5A:
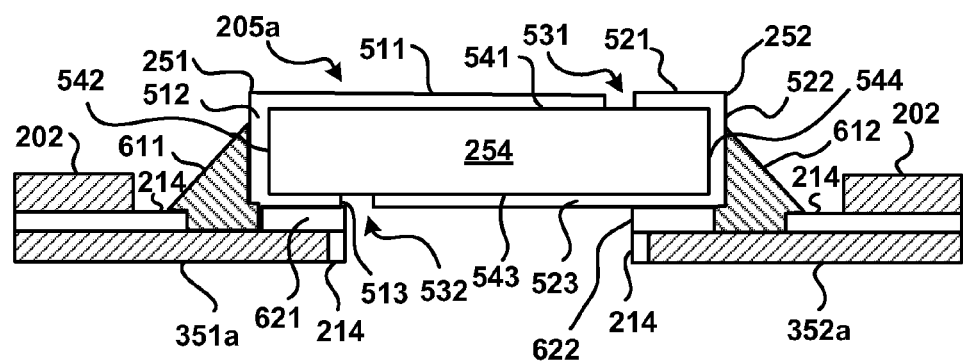
FIG. 5A is a block diagram of a cross section view schematically showing an example of a state of connection between the piezoelectric elements and the transmission wiring part, in accordance with an embodiment of the present technology.

FIG. 5A is a view in cross section schematically showing an example of a state of connection between the piezoelectric element 205a and the transmission wiring part 201. The part of the transmission wiring part 201 shown in FIGS. 3A and 3B has been omitted. The piezoelectric element 205a comprises a piezoelectric section 254 which extends/contracts according to the applied voltage, and then a first electrode 251 and a second electrode 252 on the outer side of said piezoelectric section. The piezoelectric element 205a is a layered piezoelectric element which comprises internal electrodes (not depicted) between a plurality of piezoelectric layers (not depicted). The internal electrodes are connected to the external electrodes 251, 252, with one of the internal electrodes being connected to the first electrode 251, and the other internal electrode being connected to the second electrode 252. It should be noted that the present invention may equally be applied to piezoelectric elements having a single-layer structure.

In the following description, the surface of the piezoelectric element 205a facing the transmission wiring part 201 shall be referred to as the lower surface, and the opposite surface shall be referred to as the upper surface. Furthermore, the side surface of the piezoelectric element 205a which is connected to the front-side connection pad 351a shall be referred to as the front-side surface, and the side surface of the piezoelectric element 205a which is connected to the rear-side connection pad 352a shall be referred to as the rear-side surface, and these surfaces shall be referred to in general as side surfaces.

The first electrode 251 covers part of the upper surface 541, the front-side surface 542, and part of the lower surface 543 of the piezoelectric section 254 (piezoelectric element 205a). In other words, the first electrode 251 comprises an upper surface part 511, a front-side surface part 512, and a lower surface part 513, which are continuous. The upper surface part 511 of the first electrode covers a wide section extending over more than half of the upper surface 541 in the front-torear direction. Furthermore, the lower surface part 513 of the first electrode covers only a narrow section constituting less than half of the lower surface 543. The first electrode 251 extends from one end to the other on each surface in the direction perpendicular to the page surface.

The second electrode 252 covers part of the upper surface 541, the rear-side surface 544, and part of the lower surface 543 of the piezoelectric section 254 (piezoelectric element 205*a*). In other words, the second electrode 252 comprises an upper surface part 521, a rear-side surface part 522, and a lower surface part 523, which are continuous. The upper surface part 521 of the second electrode covers only a narrow section constituting less than half of the upper surface 541 in the front-to-rear direction. The lower surface part 523 covers a wide section extending over more than half of the lower surface 543. The second electrode 252 extends from one end to the other on each surface in the direction perpendicular to the page surface.

A gap 531 is present between the upper surface part 511 of the first electrode and the upper surface part 521 of the second electrode. A gap 532 is likewise present between the lower surface part 513 of the first electrode and the lower surface part 523 of the second electrode. The gaps 531, 532 isolate the two electrodes 251, 252 on the upper and lower surfaces. In order to increase the stroke of the piezoelectric element 205*a*, it is important for the upper surface part 511 of the first electrode to extend as far as possible to the rear, and for the gap 531 to be as small as possible. It is likewise important for the lower surface part 523 of the second electrode to extend as far as possible to the front, and for the gap 532 to be as small as possible.

In this mode of embodiment, the adhesive fixing part 621 is present between the front-side end of the second electrode 252 and the electrical cross-connector 611. The front-side end of the second electrode 252 is the end of the second electrode 252 at the gap 532. The adhesive fixing part 621 consists of insulating adhesive. When the lower surface part 523 of the second electrode extends close to the front end and the gap 532 is small, it is possible to prevent contact between the cross-connector 611 and the lower surface part 523 of the second electrode because the adhesive fixing part 621 is present.

In one embodiment, the flat front-side connection pad 351*a* is connected to the first electrode 251 by means of the cross-connector 611. In FIG. 5A, the cross-connector 611 consists of solder. A similar cross-connector 611 can also be formed from conductive adhesive. The cross-connector 611 provides contact between the front-side surface 512 of the first electrode and the surface (upper surface) of the connection pad 351*a* which is exposed from the polyimide layer 212. The cross-connector 611 provides conduction between the connection pad 351*a* and the first electrode 251 and sets them to the same potential.

The adhesive fixing part 621 is a mechanical connection that fixes the piezoelectric element 205*a* to the transmission wiring part 201. The adhesive fixing part 621 is typically an epoxy-based resin which is photo curable or thermally curable. In the configuration shown in FIG. 5A, the adhesive fixing part 621 is bonded to the lower surface part 513 of the first electrode 251, and bonds the surface (upper surface) of the connection pad 351*a* which is exposed from the polyimide layer 212 to the polyimide layer 214.

The adhesive fixing part 621 extends as far as the rear end of the lower surface part 513 of the first electrode 251, but does not reach the front end of the lower surface part 513. That is to say, the front end of the adhesive fixing part 621 lies further to the rear than the front end of the lower surface part 513. Part of the cross-connector 611 enters the space between the front end part of the lower surface part 513 and the connection pad 351*a* and provides an electrical connection therein.

In this way, at least part of the cross-connector 611 is present between the lower surface part 513 and the connection pad 351*a*. The connection at the lower surface exhibits greater strength to the extension/contraction operations of the piezoelectric element 205*a* than the connection at the side surface (in this instance the front-side surface), and is therefore less likely to be damaged. From a similar viewpoint, the adhesive fixing part 621 which connects the lower surface of the piezoelectric element 205*a* and the transmission wiring part 201 may exhibit greater strength to the extension/contraction operations of the piezoelectric element 205*a*.

Figure 5B:
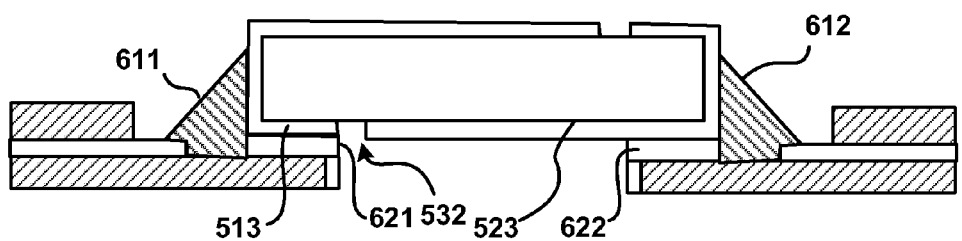
FIG. 5B is a block diagram of a cross section view schematically showing an example of a state of connection between the piezoelectric elements and the transmission wiring part, in accordance with an embodiment of the present technology.

In contrast to this, the adhesive fixing part 621 in the configuration shown in FIG. 5B comes into contact with the lower surface part 513 of the first electrode 251 and extends from the front end to the rear end of the lower surface part 513 of the first electrode 251. Consequently, the cross-connector 611 does not enter the space between the lower surface of the piezoelectric element 205*a* and the transmission wiring part 201, and only contacts the front-side surface 512 of the first electrode. In this configuration too it is possible to prevent short-circuiting of the cross-connector 611 and the second electrode 252 while the piezoelectric element 205*a* and the transmission wiring part 201 are securely fixed.

Figure 5C:
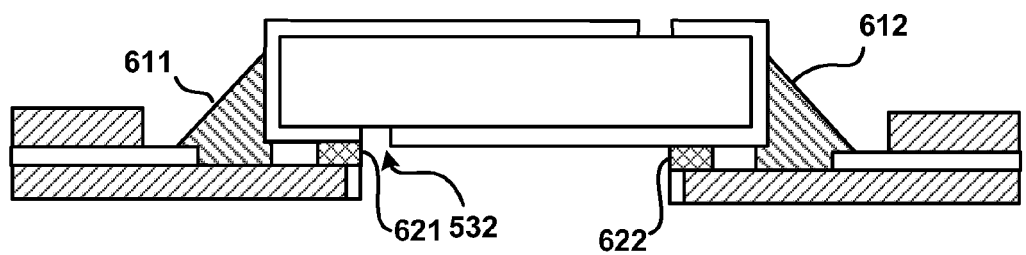
FIG. 5C is a block diagram of a cross section view schematically showing an example of a state of connection between the piezoelectric elements and the transmission wiring part, in accordance with an embodiment of the present technology.

Returning to FIG. 5A, the adhesive fixing part 621 and the cross-connector 611 are in contact at the lower surface of the piezoelectric element 205*a*. This kind of configuration is effective because it prevents the cross-connector 611 from being damaged by the extension/contraction of the piezoelectric element 205*a*. This makes it possible to increase the area of the adhesive fixing part 621 and/or the cross-connector 611 without forming an unnecessary gap between the adhesive fixing part 621 and the cross-connector 611. It should be noted that it is possible to prevent short-circuiting of the cross-connector 611 and the second electrode 252 while the piezoelectric element 205*a* and the transmission wiring part 201 are securely fixed, even if the adhesive fixing part 621 and the cross connector 611 are spaced apart, as shown in FIG. 5C.

Figure 5D:
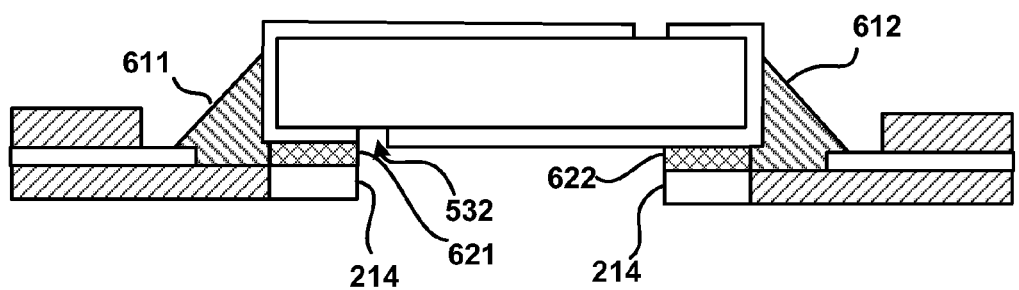
FIG. 5D is a block diagram of a cross section view schematically showing an example of a state of connection between the piezoelectric elements and the transmission wiring part, in accordance with an embodiment of the present technology.

In the configuration shown in FIG. 5A, the adhesive fixing part 621 is bonded to the connection pad 351*a*. The adhesive fixing part 621 is bonded to the connection pad 351*a* in order to make the bonding more secure. However, the adhesive fixing part 621 does not have to reach the connection pad 351*a*, and it may be bonded only to the polyimide layer outside said connection pad, as in the configuration shown in FIG. 5D. In this configuration too the connection pad 351*a* faces the lower surface 513 of the first electrode, and (part of) the cross-connector 611 is present there between, as shown in FIG. 5D.

In each of the configurations shown in FIGS. 5A-5D, the rear end of the adhesive fixing part 621 is aligned with the rear end of the lower surface 513 of the first electrode, but this need not be the case. For example, (part of) the adhesive fixing part 621 may be present within the gap 532, or (part of) the adhesive fixing part 621 may be present within the gap 532 and above the second electrode 252. Alternatively, the rear end of the adhesive fixing part 621 may lie further to the front than the rear end of the lower surface 513 of the first electrode.

The adhesive fixing layer 621 must be separated from the rear-side adhesive fixing layer 622 so as not to impede the extension/contraction operations of the piezoelectric element 205*a*. As shown in FIGS. 5A-5D, a hole or slit is formed in the transmission wiring part 201 below the piezoelectric element 205a in order to reduce the effect of the transmission wiring part 201 on the extension/contraction operations of the piezoelectric element 205a.

The section of the adhesive fixing part 621 which is not bonded to the transmission wiring part 201 contributes only slightly to the fixing of the piezoelectric element 205a, and therefore the adhesive fixing part 621 is formed further to the front than the rear end of the transmission wiring part 201 in order to reduce the effect on the extension/contraction operations of the piezoelectric element 205a. In the configurations shown in FIGS. 5A-5D, the rear end of the adhesive fixing part 621 is aligned with the rear end of the transmission wiring part 201. The adhesive fixing part 621 may equally be adhered further to the rear than the rear end of the transmission wiring part 201 provided that this does not create any problems in the operation of the piezoelectric element 205a.

The second electrode 252 of the piezoelectric element 205a is electrically connected to the rear-side connection pad 352a by means of a cross-connector 612. Furthermore, the adhesive fixing part 622 adhesively fixes the lower surface part 523 of the second electrode and the transmission wiring part 201. The structures of the cross-connector 612 and the adhesive fixing part 622 are the same as those of the cross-connector 611 and the adhesive fixing part 621, and so the description given in relation to the cross-connector 611 and the adhesive fixing part 621 can be applied to the cross-connector 612 and the adhesive fixing part 622, except that front and rear are reversed.

The electrical and mechanical connections at the front and rear of the piezoelectric element 205a thus have the same structures. Suitable electrical and mechanical connections are achieved, and this is also favorable in terms of production efficiency. However, different structures are equally feasible, depending on the design. For example, the piezoelectric element 205a and the transmission wiring part 201 may be connected by means of two different structures than the connecting structures shown in FIGS. 5A-5D. The first electrode 251 need not have the lower surface part 513, and the second electrode 252 need not have the upper surface part 521. With this configuration too a gap is formed between the electrodes at the lower surface 543 of the piezoelectric section, and the adhesive fixing part 621 demonstrates an effect whereby short-circuiting with the adhesive fixing is prevented.

Figure 6A:
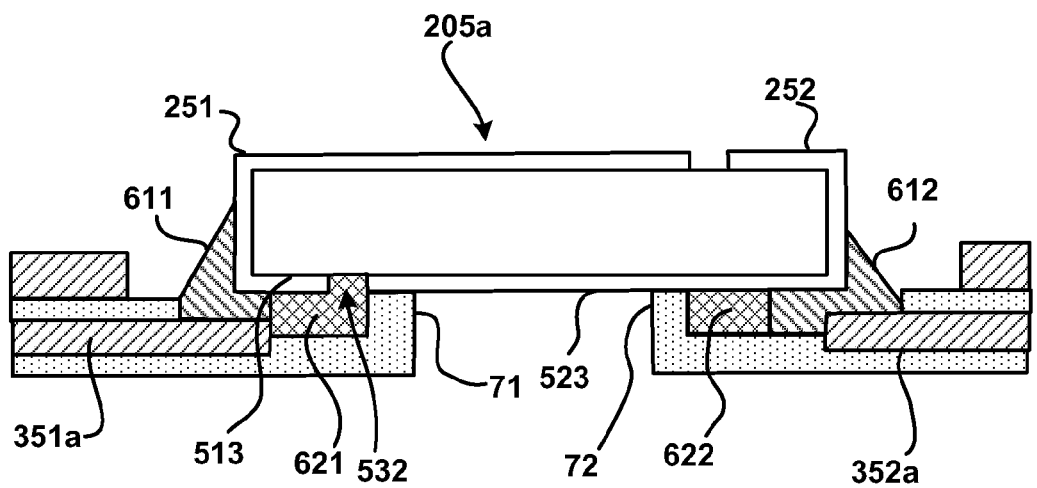
FIG. 6A is a block diagram of a cross section view schematically showing an example of a state of connection between the piezoelectric elements and the transmission wiring part, in accordance with an embodiment of the present technology.

FIG. 6A is a view in cross section schematically showing another connection structure between the piezoelectric element 205a and the transmission wiring part 201. The lower surface of the piezoelectric element 205a is in contact with spacers 71, 72, and the piezoelectric element 205a is fixed on top of the spacers 71, 72. Spacers 71, 72 of the height project by 4-6 μm from the connection pads 351a, 352a. In the example shown in FIG. 6A, the spacers 71, 72 are in contact with the lower surface part 523 of the second electrode. It is thus possible to fix the piezoelectric element 205a parallel to the gimbal 202 by placing and fixing the piezoelectric element 205a on the spacers 71, 72, and therefore it is possible to effectively cause the extension/contraction of the piezoelectric element 205a to vary the movement of the stage 131 (head-slider 105).

Furthermore, the thickness of the adhesive fixing parts 621, 622 is determined by the height of the spacers 71, 72, and therefore it is possible to prevent the adhesive fixing parts 621, 622 from becoming thinner than the design value, depending on the location, and the adhesive force can be stabilized. It is also possible to maintain a fixed thickness for the adhesive fixing parts 611, 621, independently of the HGA, and so a reduction in the adhesive force due to production variations can be prevented. The spacers 71, 72 are in direct contact with the piezoelectric element 205a, and adhesive does not infiltrate between said spacers and the piezoelectric element 205a.

The spacers 71, 72 projects toward the piezoelectric element 205a, and the distance between the spacers 71, 72 and the piezoelectric element 205a (the distance in the vertical direction in the figures) is greater than the distance between the connection pads 351a, 352a and the piezoelectric element 205a. When the spacers 71, 72 project further toward the piezoelectric element 205a than the surface of the connection pads 351a, 352a, and the piezoelectric element 205a and the spacers 71, 72 are in contact, a gap is formed between the piezoelectric element 205a and the connection pads 351a, 352a. By this means, part of the cross-connectors 611, 612 is readily formed between the lower surface part 513 of the first electrode and the connection pads 351a, 352a.

As shown in the exemplary configuration in FIG. 6A, the spacers 71, 72 function as walls for halting the spread of adhesive. The adhesive fixing parts 621, 622 are therefore formed between the spacers 71, 72 and the cross-connectors 611, 612. Furthermore, the spacers 71, 72 are of the same height, and they are each in contact with either of the electrodes of the piezoelectric element 205a. By this means, the piezoelectric element 205a can be reliably supported parallel to the stage 131. The spacers 71, 72 may be in contact with different electrodes.

The spacers may be formed on the connection pads 351a, 352a, provided that this is feasible in terms of production. The spacer of the connection pad 351a abuts the first electrode 251, and the spacer of the connection pad 352a abuts the second electrode 252. However, in order to extend the lower surface part 523 of the second electrode as far as possible to the front (closer to the connection pad 351a), (at least the surfaces of) the two spacers are formed from polyimide, and they abut the lower surface part 523 of the second electrode, thereby supporting the piezoelectric element 205a, as in the configuration shown in FIG. 6A.

Figure 6B:
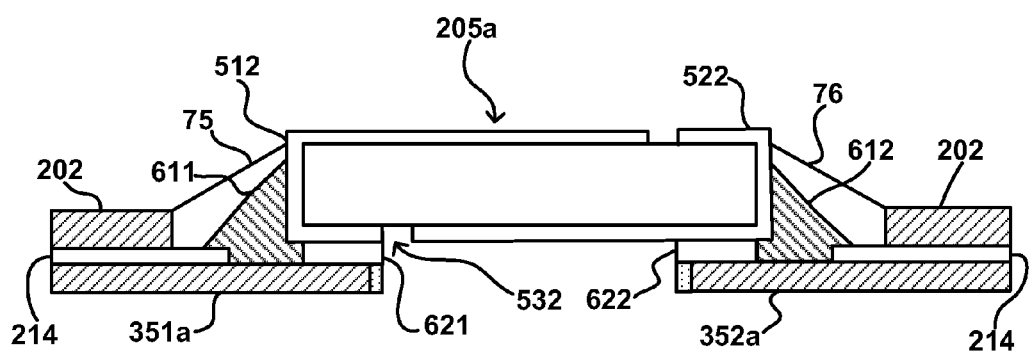
FIG. 6B is a block diagram of a cross section view schematically showing an example of a state of connection between the piezoelectric elements and the transmission wiring part, in accordance with an embodiment of the present technology.

FIG. 6B is a view in cross section schematically showing another connection structure between the piezoelectric element 205a and the transmission wiring part 201. This configuration comprises sealing parts 75, 76 which cover the cross-connectors 611, 612. The sealing parts 75, 76 may be made of resin, and may be formed from the same material as the adhesive fixing parts 621, 622. The sealing parts 75, 76 prevent oxidation of the cross-connectors 611, 612. In one embodiment, the sealing parts 75, 76 are in contact with (bonded to) (the first electrode front-side part 512 and the second electrode rear-side part 522 of) the piezoelectric element 205a and the transmission wiring part 201 or gimbal 202, respectively. This makes it possible to enhance the mechanical connection strength of the piezoelectric element 205a.

Figure 7A:
FIG. 7A illustrates an example of the method of connecting the piezoelectric elements to the transmission wiring part, in accordance with an embodiment of the present technology.
Figure 7B:
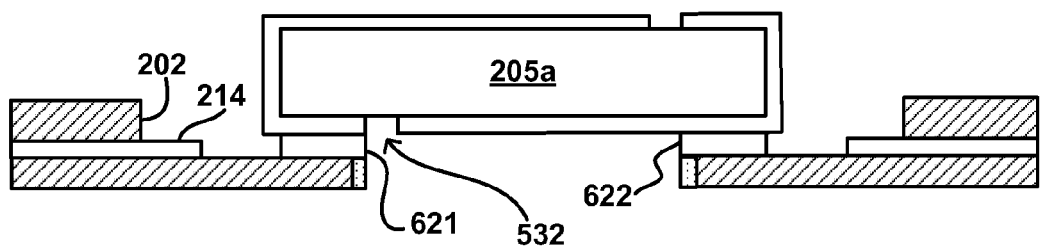
FIG. 7B illustrates an example of the method of connecting the piezoelectric elements to the transmission wiring part, in accordance with an embodiment of the present technology.

An example of the method for connecting the piezoelectric element 205a to the transmission wiring part 201 will be described next with reference to FIGS. 7A-7D. FIGS. 7A-7D correspond to the configuration shown in FIG. 5A. As shown in FIG. 7A, adhesive 81, 82 from the adhesive fixing parts 621, 622 is applied to the transmission wiring part 201. In this example, the adhesive is applied to the connection pads 351a, 352a. Next, as shown in FIG. 7B, the piezoelectric element 205a is placed on the adhesive 81, 82, and the adhesive 81, 82 is photo cured or thermally cured to form the adhesive fixing parts 621, 622.

Figure 7C:
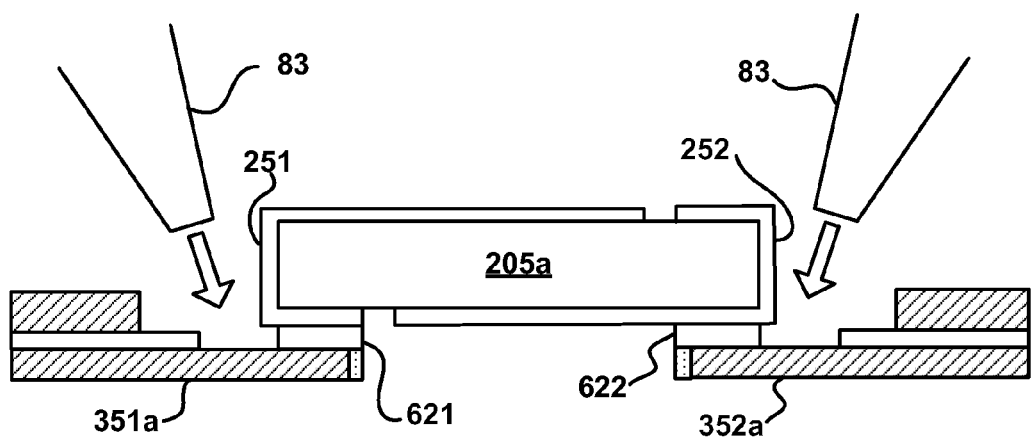
FIG. 7C illustrates an example of the method of connecting the piezoelectric elements to the transmission wiring part, in accordance with an embodiment of the present technology.
Figure 7D:
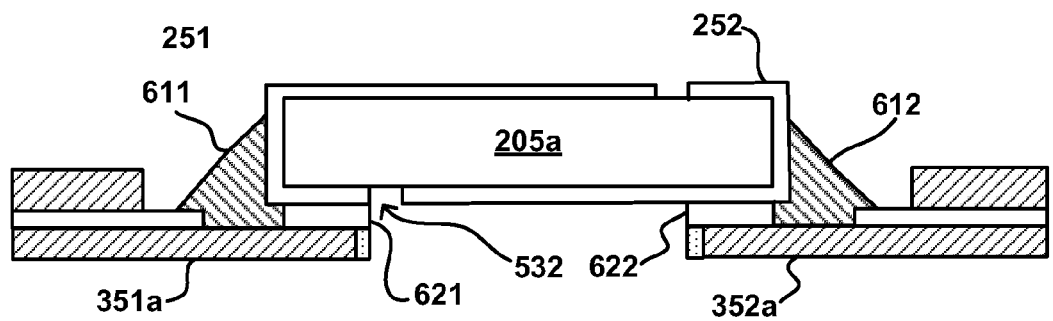
FIG. 7D illustrates an example of the method of connecting the piezoelectric elements to the transmission wiring part, in accordance with an embodiment of the present technology.

Next, as shown in FIG. 7C, molten solder is deposited, from a nozzle 83, between the first electrode 251 and the connection pad 351a. Molten solder is likewise deposited, from a nozzle 83, between the second electrode 252 and the connection pad 352a. As shown in FIG. 7D, the cross-connectors 611, 612 are formed by the hardening of the molten solder, and the first electrode 251 and connection pad 351a, and then the second electrode 252 and connection pad 352a are electrically connected to each other. It should be noted that solder joints may be positioned between the electrodes and the pads, and said joints may be fused by laser irradiation, after which the cross-connection may be formed by the hardening of said joints. It should also be noted that cross-connectors 611, 612 comprising conductive adhesive may equally be formed using the same method as shown in FIGS. 7A-7D.

Figure 8A:
FIG. 8A illustrates an example of the method of connecting the piezoelectric elements to the transmission wiring part, in accordance with an embodiment of the present technology.

Another example of the method for connecting the piezoelectric element 205a to the transmission wiring part 201 will be described next with reference to FIGS. 8A-8C. In this method, the piezoelectric element 205a and the transmission wiring part 201 are electrically connected using conductive adhesive. Conductive adhesive generally consists of an epoxy-based resin and silver particles. As shown in FIG. 8A, the adhesive 81, 82 from the adhesive fixing parts 621, 622 is applied to the transmission wiring part 201, followed by conductive adhesive 91, 92 from the cross-connectors 611, 612.

In one embodiment, the adhesive 81 is applied, after which the conductive adhesive 91 is applied. This makes it possible to more reliably prevent the conductive adhesive 91 from coming into contact with the second electrode 252. Furthermore, in a manner, the adhesive 81 and the conductive adhesive 91 are applied in separate locations so that they do not come into contact with each other. Likewise, the adhesive 82 and the conductive adhesive 92 are applied in separate locations so that they do not come into contact with each other. This makes it possible to prevent the structural adhesive and the conductive adhesive from mixing, and to prevent short-circuiting or weakening of the mechanical connection.

In this example, the adhesive 81, 82 and the conductive adhesive 91, 92 are applied onto the connection pads 351a, 352a. The adhesive 81 is applied between the conductive adhesive 91 and the gap 532. The adhesive 81, 82 lies between the conductive adhesive 91, 92. That is to say, the adhesive 81 is at the rear side of the conductive adhesive 91, while the adhesive 82 is at the front side of the conductive adhesive 92.

Figure 8B:
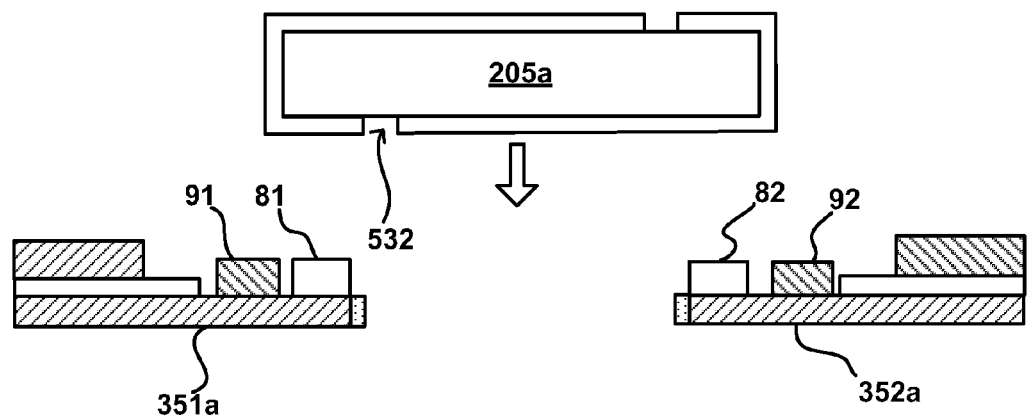
FIG. 8B illustrates an example of the method of connecting the piezoelectric elements to the transmission wiring part, in accordance with an embodiment of the present technology.
Figure 8C:
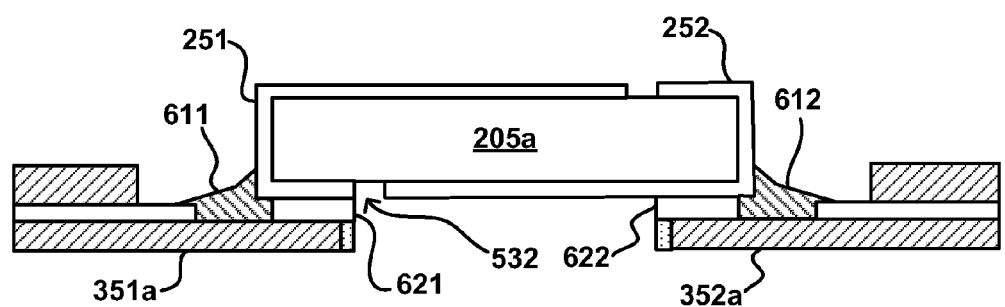
FIG. 8C illustrates an example of the method of connecting the piezoelectric elements to the transmission wiring part, in accordance with an embodiment of the present technology.

Next, as shown in FIG. 8B, the piezoelectric element 205a is placed on the adhesive 81, 82 and the conductive adhesive 91, 92. The piezoelectric element 205a is placed in such a way that the lower surface front end of the piezoelectric element 205a (first electrode 251) is positioned within the conductive adhesive 91, and the lower surface rear end of the piezoelectric element 205a (second electrode 252) is positioned within the conductive adhesive 92.

Once the piezoelectric element 205a has been put in place, it is lightly pressed in. This causes the adhesive 81, 82 and the conductive adhesive 91, 92 to spread. Some of the conductive adhesive 91 is deposited on the front surface part 521 of the first electrode 251, while some of the conductive adhesive 92 is deposited on the front surface part 522 of the second electrode 252. After this, as shown in FIG. 8C, the adhesive 81, 82 and the conductive adhesive 91, 92 are photo cured and/or thermally cured in order to form the adhesive fixing parts 621, 622 and the cross-connectors 611, 612. The cross-connector 611 and the cross-connector 612 are in contact with the lower surface and side surface of the first electrode 251, and the lower surface and side surface of the second electrode 252, respectively.

An embodiment of the present invention has been described above, but the present invention is not limited to the mode of embodiment described above. A person skilled in the art will be readily able to modify, add to, or make substitutions within the scope of the present invention. For example, the present invention is of particular use for an HDD, but it may equally be applied to other disk drive devices. The connections between the piezoelectric elements and transmission wiring part in the present invention may equally be applied to piezoelectric elements which are positioned in a different configuration to that which was described above.

The layout of the transmission wiring part is not limited to the configuration described above, and the present invention may equally be applied to any wiring layout. For example, the transmission wiring part may pass outside the head-slider, rather than passing under the head-slider. Furthermore, both of the two connection pads for the piezoelectric element may receive drive signals from the preamplifier IC, or one may be grounded. The connection pads extend to a position facing the lower surface of the piezoelectric elements, but the connection pads do not have to be positioned below the piezoelectric elements.

The foregoing descriptions of specific embodiments of the present technology have been presented for purposes of illustration and description. They are not intended to be exhaustive or to limit the technology to the precise forms disclosed, and many modifications and variations are possible in light of the above teaching. The embodiments described herein were chosen and described in order to best explain the principles of the technology and its practical application, to thereby enable others skilled in the art to best utilize the technology and various embodiments with various modifications as are suited to the particular use contemplated. It is intended that the scope of the technology be defined by the claims appended hereto and their equivalents.

What is claimed is:

1. A head gimbal assembly which comprises:
   a gimbal having a stage;
   a head-slider which is fixed to said stage;
   a piezoelectric element which comprises,
      an upper surface,
      a first side surface,
      a second side surface which is a surface opposite said first side surface,
      a lower surface,
      a first electrode which is formed on at least said upper surface and said first side surface,
      a second electrode which is formed on at least said second side surface and said lower surface, and
      a gap between said first and second electrodes on said lower surface, said piezoelectric element moving said stage by extension or contraction thereof according to a voltage applied to said first and second electrodes;
   a transmission wiring part which has a connection pad for said piezoelectric element;
   a cross-connector for physically and electrically cross-connecting said first electrode and said connection pad; and
   an adhesive fixing part which is formed from an insulating adhesive and adhesively fixes said lower surface of said piezoelectric element to said transmission wiring part, between an end of said second electrode at said gap and said cross-connector.

2. The head gimbal assembly of claim 1, wherein a part of said first electrode is formed on said lower surface of said piezoelectric element; and
   said cross-connector cross-connects said part of said first electrode and said connection pad.

3. The head gimbal assembly of claim 1, wherein said cross-connector and said adhesive fixing part are in contact.

4. The head gimbal assembly of claim 1, wherein said transmission wiring part comprises a spacer which projects toward said head-slider and supports said head-slider.

5. The head gimbal assembly of claim 4, wherein said spacer is formed on an insulating layer of said transmission wiring part.

6. The head gimbal assembly of claim 4, wherein said adhesive fixing part is formed between said spacer and said cross-connector.

7. The head gimbal assembly of claim 1, which further comprises a sealing part for covering said cross-connector.

8. The head gimbal assembly of claim 7, wherein said sealing part adhesively fixes said piezoelectric element and said transmission wiring part.

9. The head gimbal assembly of claim 1, which further comprises:
 a second cross-connector for electrically cross-connecting said second electrode and a second connection pad of said transmission wiring part; and
 a second adhesive fixing part which lies between said second cross-connector and said adhesive fixing part, and adhesively fixes said lower surface of said piezoelectric element to said transmission wiring part.

10. The head gimbal assembly of claim 1, wherein said piezoelectric element is disposed on a reverse of a surface of said transmission wiring part where said head-slider is connected, at a rear side of said stage, and extends and contracts in a front-to-rear direction of a suspension; and
 said head gimbal assembly further comprises a second piezoelectric element which is disposed in a line in a left-to-right direction with said piezoelectric element on said reverse of said surface of said transmission wiring part at said rear side of said stage, and which extends and contracts in said front-to-rear direction.

11. A disk drive comprising:
 an enclosure;
 a spindle motor which is fixed inside said enclosure and rotates a disk;
 an actuator which is provided with a suspension for supporting a head-slider above said disk rotated by said spindle motor, and which is pivoted by means of a voice coil motor, wherein:
 said suspension comprises:
 a head gimbal assembly having a stage to which said head-slider is fixed;
 a piezoelectric element which comprises,
  an upper surface,
  a first side surface,
  a second side surface which is a surface opposite said first side surface,
  a lower surface,
  a first electrode which is formed on at least said upper surface and said first side surface,
  a second electrode which is formed on at least said second side surface and said lower surface, and
  a gap between said first and second electrodes on said lower surface, said piezoelectric element moving said stage by extension or contraction thereof according to a voltage applied to said first and second electrodes;
 a transmission wiring part which has a connection pad for said piezoelectric element;
 a cross-connector for physically and electrically cross-connecting said first electrode and said connection pad; and
 an adhesive fixing part which is formed from an insulating adhesive and adhesively fixes said lower surface of said piezoelectric element to said transmission wiring part, between an end of said second electrode at said gap and said cross-connector.

12. The disk drive of claim 11, wherein a part of said first electrode is formed on said lower surface of said piezoelectric element, and
 said cross-connector cross-connects said part of said first electrode and said connection pad.

13. The disk drive of claim 11, wherein said cross-connector and said adhesive fixing part are in contact.

14. The disk drive of claim 11, wherein said transmission wiring part comprises a spacer which projects toward said head-slider and supports said head-slider.

15. The disk drive of claim 11, which further comprises a sealing part for covering said cross-connector.

16. The disk drive of claim 11, which further comprises:
 a second cross-connector for electrically cross-connecting said second electrode and a second connection pad of said transmission wiring part; and
 a second adhesive fixing part which lies between said second cross-connector and said adhesive fixing part, and adhesively fixes said lower surface of said piezoelectric element to said transmission wiring part.

17. The disk drive of claim 11, wherein said piezoelectric element is disposed on a reverse surface of said transmission wiring part to where said head-slider is connected, at a rear side of said stage, and extends in a front-to-rear direction of said stage; and
 said head gimbal assembly further comprises a second piezoelectric element which is disposed in a line in a left-to-right direction with said piezoelectric element on said reverse surface of said transmission wiring part at said rear side of said stage, and which extends and contracts in said front-to-rear direction.

* * * * *